(12) United States Patent
Joutsiniemi

(10) Patent No.: US 8,087,897 B2
(45) Date of Patent: Jan. 3, 2012

(54) FLUID ROTOR

(75) Inventor: Risto Joutsiniemi, Pihtipudas (FI)

(73) Assignee: Windside America, St. Paul, MN (US)

( * ) Notice: Subject to any disclaimer, the term of this patent is extended or adjusted under 35 U.S.C. 154(b) by 865 days.

(21) Appl. No.: 12/012,503

(22) Filed: Feb. 1, 2008

(65) Prior Publication Data
US 2009/0196750 A1 Aug. 6, 2009

(51) Int. Cl.
*F01D 5/14* (2006.01)
(52) U.S. Cl. ........... 416/144; 416/197 A; 416/236 R; 415/4.2; 415/4.4
(58) Field of Classification Search .......... 416/144, 416/197 A, 236 R, 237, 243; 415/4.2, 4.4
See application file for complete search history.

(56) References Cited

U.S. PATENT DOCUMENTS

| | | | |
|---|---|---|---|
| 1,766,765 A | 6/1930 | Savonius | |
| 2,596,726 A * | 5/1952 | Rydell | 416/4 |
| 4,293,274 A | 10/1981 | Gilman | |
| 4,589,820 A | 5/1986 | Butler, Jr. | |
| 5,850,108 A | 12/1998 | Bernard | |
| 6,831,374 B2 | 12/2004 | Seki | |
| 7,132,760 B2 | 11/2006 | Becker | |
| 7,344,353 B2 * | 3/2008 | Naskali et al. | 415/4.2 |
| 7,371,135 B1 * | 5/2008 | Vanderhye et al. | 416/197 R |
| 2004/0061337 A1 | 4/2004 | Becker | |
| 2007/0077145 A1 | 4/2007 | Kinkaid et al. | |
| 2008/0150284 A1 | 6/2008 | Fein et al. | |

FOREIGN PATENT DOCUMENTS

| | | |
|---|---|---|
| CA | 1236030 | 5/1988 |
| EP | 0040193 | 4/1984 |
| FI | 67919 | 4/1984 |
| JP | 60-090992 | 5/1985 |
| JP | 2004285756 A | 10/2004 |
| JP | 2006348810 A | 12/2006 |
| WO | WO 81/01443 | 5/1981 |
| WO | WO 99/04164 | 1/1999 |
| WO | WO 2007/113593 A1 | 10/2007 |

OTHER PUBLICATIONS

"Acoustic test of Windside WS-0.30B wind turbine according to the International Standard IEC 61400-11", *University of Vaasa Electrical Engineering Bertis Brännbacka Timo Rinne*, Oct. 2, 2006, 2 pages.
Application and File History for U.S. Appl. No. 12/164,305, filed Jun. 30, 2008. Inventor: Risto Joutsiniemi.
PCT International Search Report, PCT/US2008/069481, International filed Jul. 9, 2008, Applicant: Windside America et al., dated Jan. 29, 2009, 3 pages.

(Continued)

*Primary Examiner* — Igor Kershteyn
(74) *Attorney, Agent, or Firm* — Patterson Thuente Christensen Pedersen, P.A.

(57) ABSTRACT

A rotor having at least two flightings includes a plurality of elongated support ribs rigidly interconnecting at axially spaced intervals, the outer edge of a first flighting with the inner edge of the other flighting, the ribs having a connecting boss at a distal end and a balancing mass intermediate a proximal end and the distal end. A method of forming the rib is further included.

18 Claims, 2 Drawing Sheets

OTHER PUBLICATIONS

PCT Written Opinion, PCT/US2008/069481, International filed Jul. 9, 2008, Applicant: Windside America et al, dated Jan. 29, 2009, 4 pages.
PCT Written Opinion, PCT/US2009/030086, International filed Jan. 5, 2009, Applicant: Joutsiniemi, dated Aug. 10, 2009, 4 pages.

PCT International Search Report, PCT/US2009/030086, International filed Jan. 5, 2009, Applicant: Joutsiniemi, dated Aug. 10, 2009, 4 pages.

* cited by examiner

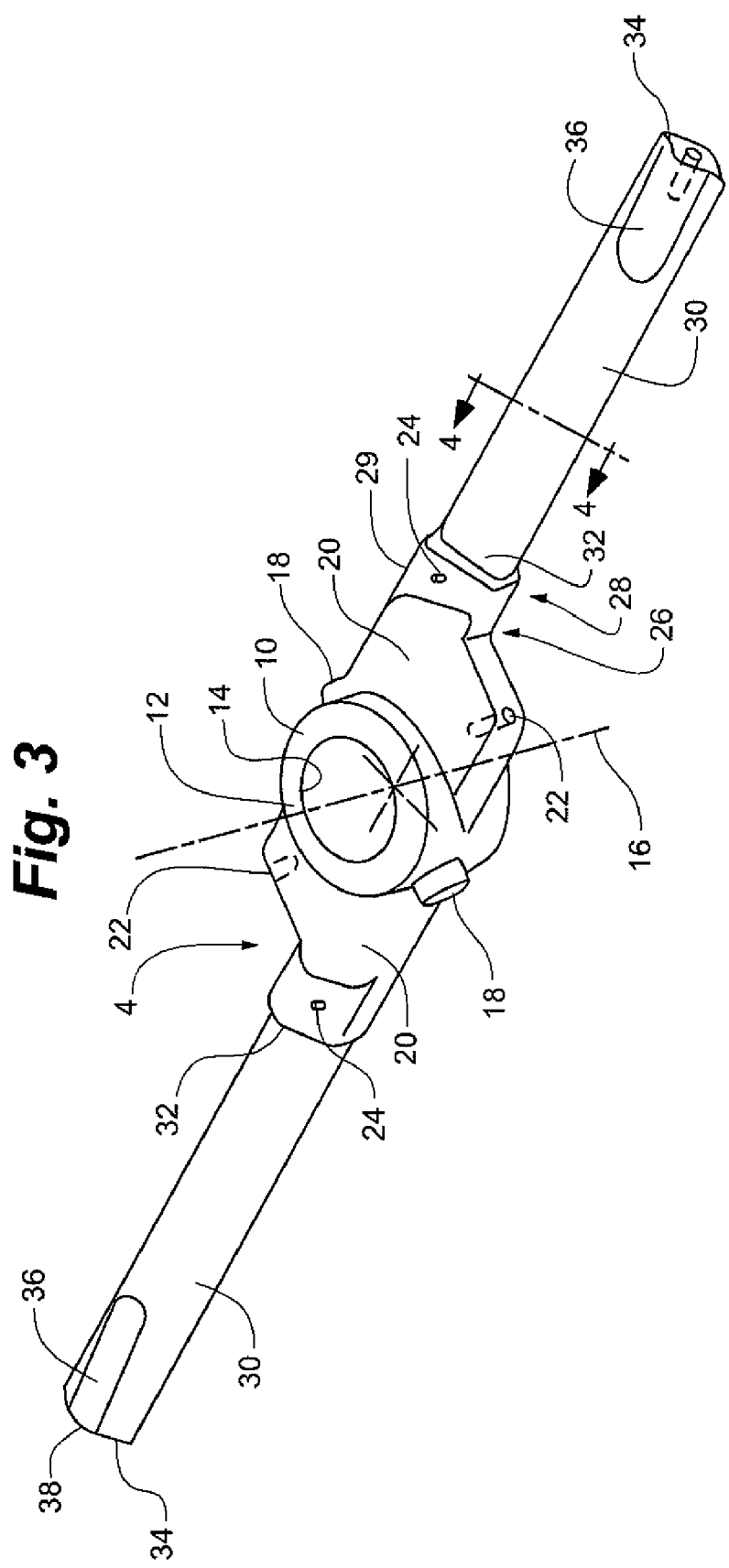

FLUID ROTOR

BACKGROUND OF THE INVENTION

The present invention concerns a rotor for a turbine device of a type disclosed in the PCT Publication W/O 81/01443 and Canadian Patent 1,236,030. Such a prior art device comprises:

a base;
a frame pivotably connected to the base;
a rotor comprising a pair of elongated flightings having an outer and an inner edge and a curved, e.g., semicircular, cross-section and arranged in axial direction about a geometrical axis in a symmetrical fashion such that the concave sides of the flightings partially overlap each other, defining an axial passage between the inner edges of the flightings, the flightings being twisted in a screw-shaped manner in relation to one another;
a longitudinal connecting at least one end of the rotor to a frame in a pivotable manner; and
a plurality of elongated, generally airfoil-like ribs rigidly interconnecting, at axially spaced intervals, the outer edge of each flighting with the inner edge of the other flightings, said ribs being arranged in a substantially perpendicular relationship to the geometrical axis, and the cross-sectional of the ribs being convex in one and same direction of the geometrical axis.

It is very important for longevity reasons that the rotor be properly balanced and that it rotate so that it does not excite the natural frequencies of the rotor. The prior art rotor described above lacks a convenient means to balance the rotor and to affect the resonant frequency of the rotor easily. Further, the prior art rotor needs means for the most cost effective construction thereof.

SUMMARY OF THE INVENTION

The present invention is based on the idea that by providing a rotor of the above type with spaced airfoil-shaped support ribs and including balancing and connecting masses, particularly advantageous balancing conditions within the rotor are achieved. Further, the rotor maybe readily and cost effectively assembled.

The rotor, according to the invention, is mainly characterized by a plurality of elongated, generally airfoil like support ribs rigidly interconnecting, at axially spaced intervals, the outer edge of each flighting with the inner edge of the other flighting, said ribs being arranged in a substantially perpendicular relationship to the geometrical axis, and the cross-section of the ribs being convex in one and same direction of the geometrical axis. The ribs having a connecting boss at the distal end and an intermediate balancing mass.

The present invention is a rotor having at least two flightings and including a plurality of elongated support ribs rigidly interconnecting at axially spaced intervals, the outer edge of a first flighting with the inner edge of the other flighting, the ribs having a connecting boss at a distal end and a balancing mass intermediate a proximal end and the distal end. The present invention is further a method of forming the rib.

The rotor, according to the invention, will be examined in more detail, reference being made to the attached drawings, in which:

BRIEF DESCRIPTION OF THE DRAWINGS

FIG. 3 is a perspective view of a rib;

DETAILED DESCRIPTION OF THE DRAWINGS

Figure 1:
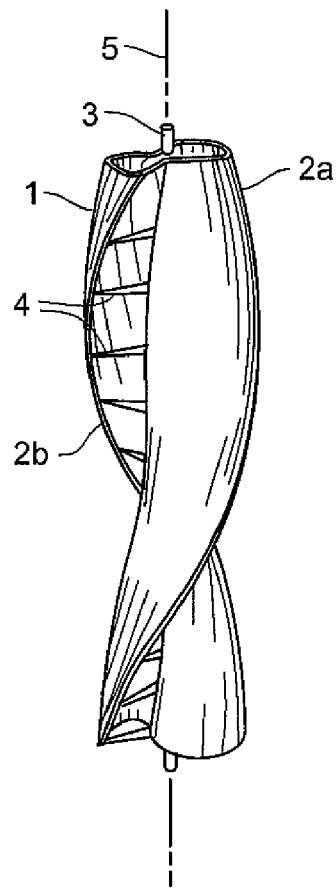
FIG. 1 is an elevational view of one embodiment of the rotor according to the invention.

The rotor of the present invention is depicted generally at 1 in the figures. The rotor 1 according to the invention comprises a pair of elongated flightings 2a, 2b having a curved, preferably semi-circular, cross section.

The flightings 2a, 2b are arranged axially about a longitudinal, geometrical axis 5 (see FIG. 1) in a symmetrical fashion such that the concave sides of the flightings 2a, 2b partially overlap each other. Thereby an axial passage is defined between the inner edges of the flightings 2a, 2b. The flightings 2a, 2b are twisted in a screw-shaped manner in relation to one another by substantially 180°. The length of the rotor 1 is preferably at least four times its diameter.

A longitudinal shaft 3 is connected at least one end to a supporting frame (not shown) in a rotatable manner. The shaft 3 is concentric with the axis 5. As discussed above, the connection may also be pivotable. In that case means are provided for resiliently keeping the rotor 1 in a first axial direction in relation to a supporting frame but allowing the rotor 1 to pivot as a function of the wind strength influencing the rotor 1.

A plurality of elongated, generally blade-like support ribs 30, rigidly interconnect, at preferably axially equidistant intervals, the outer edge of each of the respective flightings 2a, 2b with the inner edge of the other flighting 2b, 2a, the outer edge of flighting 2a being connected to the inner edge of flighting 2b and likewise for the outer edge of flighting 2b. Said ribs 30 are arranged in a substantially perpendicular relationship to the longitudinal axis 5 and their cross section is convex in the upper direction with respect to a vertically mounted rotor 1, as depicted in FIG. 4.

Figure 4:
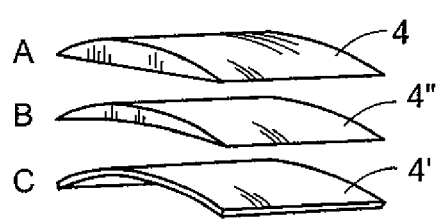
FIG. 4 shows sectional views of three different support rib shapes. Taken along section line 4-4 of FIG. 3.

As seen in FIG. 4, the cross section of the blade 30 may consist of a convex upper side and a linear lower side. (Embodiment A). The cross-section may also have a concave lower side (Embodiments B and C) in the common manner of airfoil designs.

Figure 2:
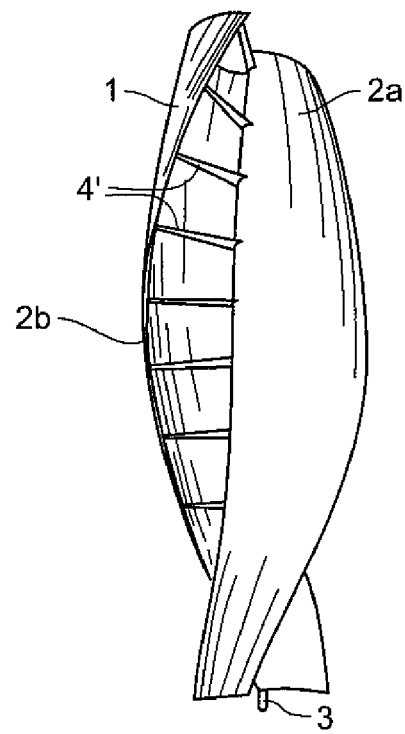
FIG. 2 is an elevational view of a second embodiment of the invention.

The shaft 3 may extend over the whole axial length of the rotor 1 as is the case in FIG. 1, or the rotor may be constructed with only a short shaft portion 3 (FIG. 2).

The rib of the rotor 1 is shown generally at 4 in FIG. 3. The rib 4 is formed of two major subcomponents; hub 10 and blade 30.

The hub 10 of the rib 4 includes a hub body 12. An axial bore 14 is defined in the hub body 12. The axial bore 14 is defined coaxial with the longitudinal axis 5 of the rotor 1.

A pair of threaded bores 18 penetrate the hub body 12 and intersect the axial bore 14. When the rib 4 is disposed on the shaft 3, bolts (not shown) may be threadedly disposed in the respective threaded bores 18, the end of the respective bolts bearing on the exterior margin of the shaft 3 to fixedly couple the rib 4 to the shaft 3.

A pair of opposed flighting inner edge supports 20 are preferably formed integral with the hub body 12. Each of the flighting inner edge supports 20 includes an angled support face 21. A blind threaded bore 22 commences at each respective support phase 21 and extends inward into the respective flighting inner edge supports 20.

A selectable balancing mass 24 may be formed integral with the flighting inner edge support 20. The selectable balancing mass 24 preferably extends radially from the hub body 12. As depicted in FIG. 3, the selectable balancing mass 24 has an inner margin 26 and an outer margin 28. The distance between the inner margin 26 and the outer margin 28 may be varied as desired to suitably affect the mass of selectable balancing mass 24. Other known means may be utilized to affect such mass, such as varying of the exterior margin 29 of the balancing mass 24 and forming the balancing mass 24 of a material having a greater or less mass as desired, for example.

The blade 30 extends radially outward from the hub 10 and is coupled to the selectable balancing mass 24 at the proximal end 32 of the blade 30. A coupling boss 36 is formed at the distal end 34 of the blade 30. The coupling boss 36 presents a flighting outer edge support face 40 having a blind threaded bore 38 defined therein.

The ribs 4 are preferably made of metal, whereas the flightings 2a, 2b can be made of metal or plastic.

The selectable balancing mass 24 of the hub 10 is selected to suitably balance the rotating mass of the rotor 1. Such balancing takes into account the effects of the mass of the shaft 3, the flighting 2, and the rib 4 itself for a known range of rotational velocities to be experienced by the rotor 1. Further, the mass of the selectable balancing mass 24 is selected such that the resonant frequency of the rotor 1 lies either below or above the range of rotational velocities to be experienced by the rotor 1. Avoiding operation of the rotor 1 in the vicinity of its natural frequency is critical to minimizing potentially destructive resonances in the rotating rotor 1.

Figure 5:
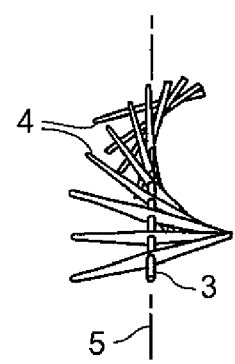
FIG. 5 is a perspective view of a shaft and rib arrangement of an embodiment of the invention.

In assembly, the individual ribs 4 may be disposed on the shaft 3 as depicted in FIG. 5. The flighting 2a, 2b may then be coupled to the individual ribs 4. The inner margin of flighting 2a is coupled by a bolt (not shown) disposed in the blind threaded bore 22, thereby coupling the flighting to a flighting inner edge support face 21. The outer margin of the flighting 2a is then coupled by a bolt (not shown) disposed in the blind threaded bore 38 of the opposed blade 30. Such bolting secures the outer margin of the flighting 2a to the flighting outer margin support face 40. The flighting 2b may then be coupled to the rib 4 in a similar manner.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

What is claimed is:

1. A rotor having at least two flightings and including a plurality of elongated support ribs rigidly interconnecting at axially spaced intervals, the outer edge of a first flighting with the inner edge of a second flighting, said ribs having a connecting boss at a distal end and a balancing mass intermediate a proximal end and the distal end.

2. The rotor of claim 1, the rib having a hub, the balancing mass being formed integral with the hub.

3. The rotor of claim 1, the balancing mass being variable to affect the resonance of the rotating rotor.

4. The rotor of claim 1, the balancing mass being formed of a material different from a material forming a rib hub.

5. The rotor of claim 1, the connecting boss including a threaded bore defined therein.

6. The rotor of claim 1 including an airfoil shaped portion being disposed intermediate the connecting boss and the balancing mass.

7. A rib for a rotor, the rotor having at least two flightings, comprising:
a rib assembly for rigidly interconnecting, at axially spaced intervals, the outer edge of a first flighting with the inner edge of a second flighting, said rib assembly having a connecting boss at a distal end and a balancing mass intermediate a proximal end and the distal end.

8. The rib of claim 7, the rib assembly having a hub, the balancing mass being formed integral with the hub.

9. The rib of claim 7, the balancing mass being variable to affect the resonance of the rotating rotor.

10. The rib of claim 7, the balancing mass being formed of a material different from a material forming a rib hub.

11. The rib of claim 7, the connecting boss including a threaded bore defined therein.

12. The rib of claim 7 including an airfoil shaped portion being disposed intermediate the connecting boss and the balancing mass.

13. A method of forming a rib for a rotor, the rotor having at least two flightings, comprising:
forming a rib assembly for rigidly interconnecting, at axially spaced intervals, the outer edge of a first flighting with the inner edge of a second flighting, and forming said ribs with a connecting boss at a distal end and a balancing mass intermediate a proximal end and the distal end.

14. The method of claim 13, the rib assembly having a hub, including forming the balancing mass integral with the hub.

15. The method of claim 13, including forming the balancing mass to be variable to affect the resonance of the rotating rotor.

16. The method of claim 13, including forming the balancing mass of a material different from a material forming a rib hub.

17. The method of claim 13, including forming the connecting boss with a threaded bore defined therein.

18. The method of claim 13 including an airfoil shaped portion being disposed intermediate the connecting boss and the balancing mass.

* * * * *